Figure 3:
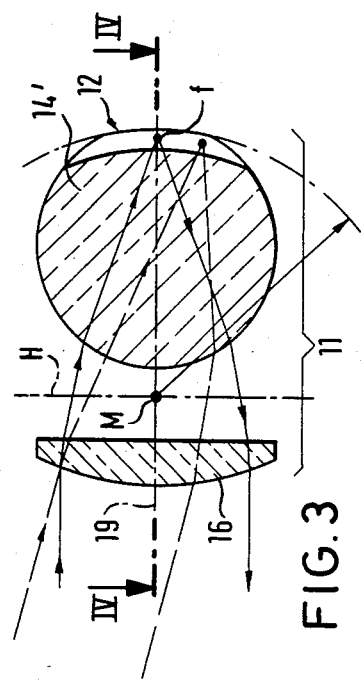

United States Patent [19]

Sick

[11] Patent Number: 4,660,929

[45] Date of Patent: Apr. 28, 1987

[54] RETROREFLECTOR

[75] Inventor: Erwin Sick, Icking, Fed. Rep. of Germany

[73] Assignee: Erwin Sick GmbH Optik-Elektronik, Waldkirch, Fed. Rep. of Germany

[21] Appl. No.: 676,330

[22] Filed: Nov. 29, 1984

[30] Foreign Application Priority Data

Dec. 8, 1983 [DE] Fed. Rep. of Germany ....... 3344478

[51] Int. Cl.⁴ .................. G02B 5/126; G02B 3/04; G02B 17/00
[52] U.S. Cl. .................... 350/104; 350/433; 350/446
[58] Field of Search ............. 350/97, 100, 103, 104, 350/105, 106, 167, 422, 443, 433, 446, 574

[56] References Cited

U.S. PATENT DOCUMENTS 2,067,701 1/1937 James ............................ 350/103
2,115,906 5/1938 Dickson et al. ................ 350/109

FOREIGN PATENT DOCUMENTS 2936012 3/1981 Fed. Rep. of Germany ........ 350/97

Primary Examiner—John K. Corbin
Assistant Examiner—Vincent J. Lemmo
Attorney, Agent, or Firm—Townsend and Townsend

[57] ABSTRACT

An elongate retroreflector has a cylindrical lens arrangement (11) and a cylindrical stepped mirror arrangement arranged therebehind, with the axis (M) of the cylindrical stepped mirror arrangement extending parallel to the axis of the cylindrical lens arrangement (11) and lying on the principal plane (H) of the cylindrical lens arrangement, whereas the focal line (f) of the cylindrical lens arrangement (11) is arranged on the stepped mirror arrangement (12).

8 Claims, 6 Drawing Figures

RETROREFLECTOR

The invention relates to an elongate retroreflector having small mirror surfaces arranged at angles to one another which reflect back incident light beams parallel to themselves.

In general triple mirrors, Scotchlite reflectors, dome lenses, etc. are used as retroreflectors. Such retroreflectors have the characteristic that they essentially reflect incident light beams back on themselves independently of the direction of incidence, which can if necessary give rise to a certain lateral parallel displacement.

It is frequently desired to construct such retroreflectors in strip-like form, i.e. with an extent in substantially one direction. This is for example necessary with optical scanning apparatus in which a scanning light beam periodically sweeps over a material web in a specific direction, for example for fault finding, with a retroreflector, which may for example be arranged behind the material web, being intended to reflect light which passes through the web as a result of faults therein back on itself.

Elongate retroflectors can be obtained if one, for example, cuts existing retroreflecting material consisting of many small triple mirrors into strips. The triple mirrors have however a relatively complicated three-dimensional construction, so that a high level of expense and complexity is necessary to achieve trouble free retroreflecting characteristics. Other retroreflectors, which are not ideal to manufacture and are expensive, have relatively pronounced scattering characteristics which is undesirable in many cases, simply as a result of the light losses that are associated therewith.

The object underlying the invention is thus to provide an elongate retroreflector of the initially named kind which is particularly simple to manufacture and has a compact construction, with the retroreflecting characteristics being obtained in problem free manner despite the less expensive and less complicated manufacturing process.

In order to satisfy this object the invention provides that a cylindrical stepped mirror arrangement is located behind a cylindrical lens arrangement, with the axis of the cylindrical stepped mirror arrangement extending parallel to the axis of the cylindrical lens arrangement and lying on the principal plane of the cylindrical lens arrangement adjacent the stepped mirror arrangement, while the focal line of the cylindrical lens arrangement is arranged on the stepped mirror arrangement.

The thought underlying the invention is thus to be seen in the fact that one exploits the optical refraction characteristics of a cylindrical lens arrangement in the plane perpendicular to the longitudinal direction in order to provide a retroreflection. For this purpose the suitably curved stepped mirror arrangement should be brought into the focal line of the cylindrical lens arrangement, and indeed essentially perpendicular to the optical axis or plane of the lens arrangement so that light incident at a specific angle within the plane extending at right angles to the longitudinal direction emerges again from the cylindrical lens arrangement parallel to the incident beam after reflection at the stepped mirror arrangement.

In the optical plane of the cylindrical lens arrangement perpendicular thereto the retroreflection effect is however obtained by the stepped mirrors which are preferably arranged at an angle of substantially 90° to one another. Light incident on a single mirror of the stepped mirror arrangement is reflected to the adjacent individual mirror which is arranged at 90° thereto and is reflected back by this individual mirror parallel to the incident light beam.

The retroreflecting characteristics are thus obtained by two quite different optical elements in the two planes which are perpendicular to one another, namely on the one hand by a cylindrical lens system and on the other hand by a stepped mirror arrangement or strip.

The particular advantage of this construction lies in the fact that the stepped mirror arrangement only contains two mirror surfaces which cooperate with one another and not three or more surfaces such it is the case with triple mirrors or with Scotchlite. The mirror surfaces which are perpendicular to one another can be substantially more easily manufactured in an accurate arrangement, for example by milling or pressing, than is the case with a three-dimensional mirror structure. Cylindrical lens arrangements for the purpose of the invention are also available with the required level of accuracy.

It is particurly advantageous if the stepped mirror arrangement is formed on a rod with grooves which are preferably pressed therein or milled therein, with the flanks of the grooves forming the individual mirrors.

The grooves are curved relative to the longitudinal direction and the flanks of the grooves are of corresponding cylindrical mirror like shape. When forming the grooves account can be taken of the situation in which the principle planes of the cylindrical lens arrangement are not entirely flat so that appropriate compensation can be provided by suitable curvature of the stepped mirror arrangement.

The rod is preferably a light conducting rod, with a round shape being preferred, whereby the light conducting rod can also form a part of the cylindrical lens arrangement. In order to complete the action of the cylindrical lens arrangement a separate cylindrical lens should however also be positioned in front of the light conducting rod.

A further embodiment is characterised in that the cylindrical lens arrangement is constructed in the manner of a dome lens and in that the stepped mirror arrangement forms the reflector of the dome lens arrangement. A dome lens is normally a rotationally symmetrical structure. The invention provides for the first time a dome lens constructed in the manner of a cylindrical lens with the retroreflecting characteristic in the planes which contain the longitudinal direction not being obtained by the dome lens effect but instead on the contrary through the stepped mirror arrangement in accordance with the invention, which is located at the position of the cylindrical surface-like reflector which is characteristic for a dome lens.

Figure 4:
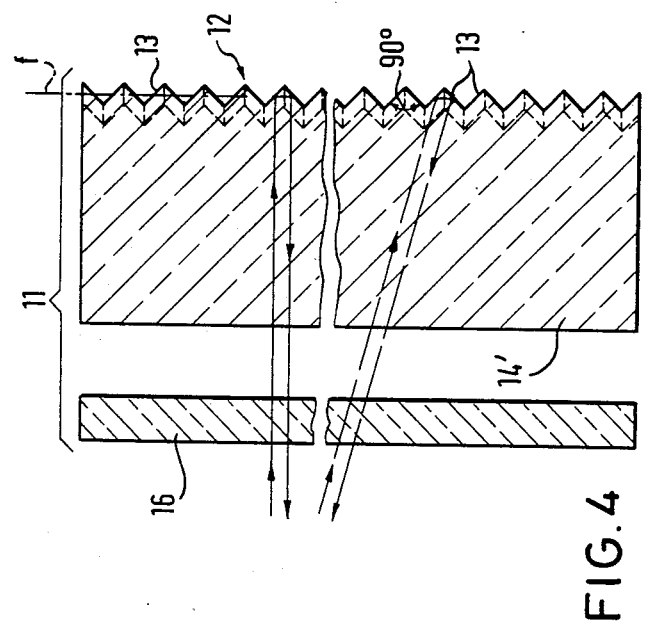
Figure 1:
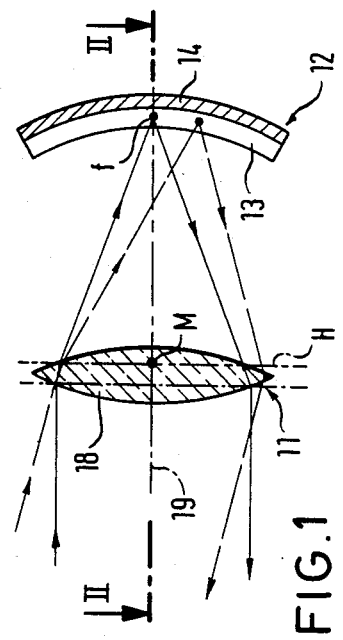
Figure 2:
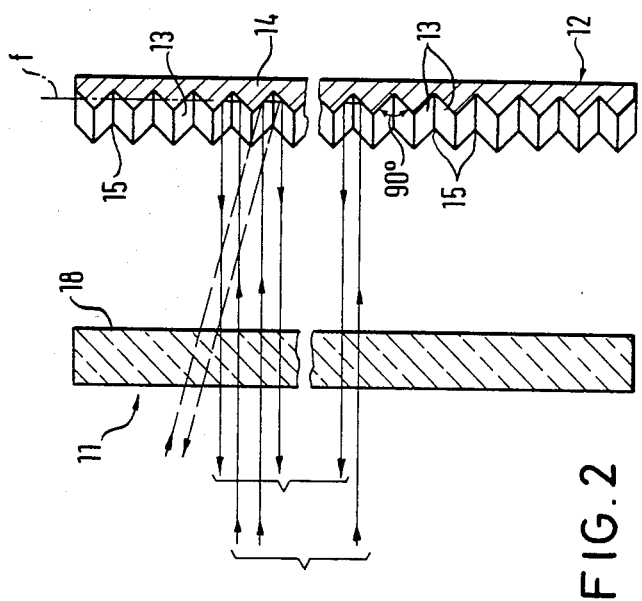
Figure 5:
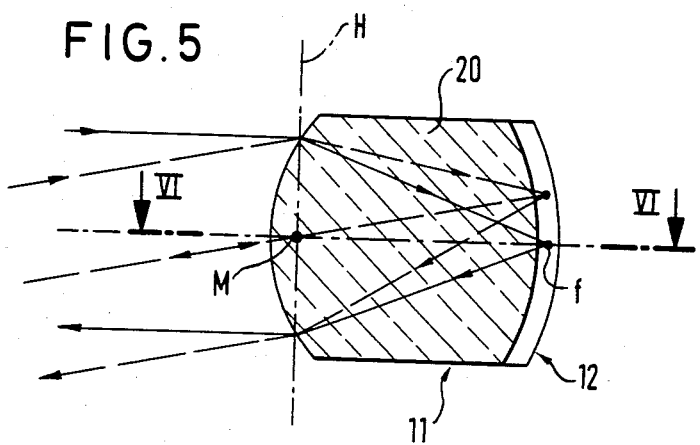
Figure 6:
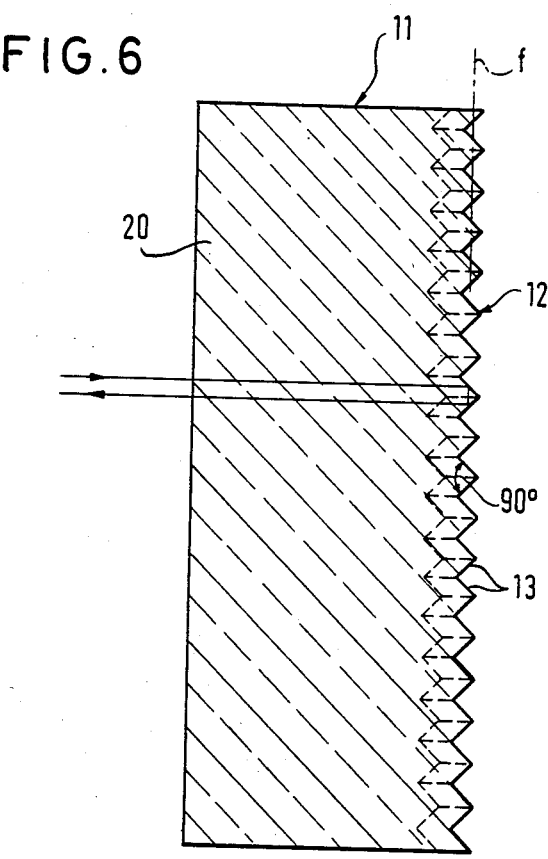

The invention will now be described in the following by way of example and with reference to the drawing in which are shown:

FIG. 1 a cross-section of a first embodiment of an elongate retroreflector in accordance with the invention, FIG. 2 a section of the line II—II in FIG. 1, FIG. 3 a cross-section of an embodiment of the retroreflector of the invention which operates with a light conducting rod, FIG. 4 a section on the line IV—IV in FIG. 3, FIG. 5 an embodiment of a retroreflector in accordance with the invention which operates in the manner of a dome lens, and FIG. 6 a section on the line VI—VI in FIG. 5.

As seen in FIG. 1 a right cylindrical stepped mirror arrangement 12 is provided at the focal line f of a cylindrical lens 18 which forms the cylindrical lens arrangement 11 of the invention. As seen in FIG. 2 the stepped mirror arrangement 12 comprises cylindrical grooves 15 which are arranged essentially perpendicular to the optical axis 19 directly alongside one another, with the central axis M of the grooves 15 lying in the principle plane H of the cylindrical lens 18 adjacent the stepped mirror arrangement 12, and on the optical axis or plane 19 of the cylindrical lens 18, with the flanks of the grooves being arranged at an angle of 90° to one another and forming curved strip-like individual mirrors 13. The grooves 15 are formed on a rod 14 which extends parallel to the cylindrical lens 18.

As a result of the arrangement of the invention light beams which enter into the cylindrical lens 18, both in the plane of FIG. 1 and also in the plane of FIG. 2 are reflected back parallel to themselves which is illustrated in FIGS. 1 and 2 for various light beams, which are partly illustrated in full lines, partly in broken lines. Whereas the lateral beam displacement in the plane of FIG. 1 is relatively large, in correspondence with the width of the cylindrical lens 18, the lateral beam displacement in the plane of FIG. 2 is very small and determined by the size of the individual mirrors 13. The smaller the extent of the individual mirrors 13 in the longitudinal direction the smaller is the beam displacement.

As a result of the construction of the invention the retroreflecting characteristics in the planes at right angles to one another can, if desired, also be different from each other. If one wishes for example to have a very accurate retroreflection in the plane of FIG. 1 then the cylindrical lens 18 and the curvature of the stepped mirror arrangement 12 must be of appropriately high optical quality. On the other hand, one can obtain an accurate retroreflection in the plane of FIG. 2 by a suitably accurate construction of the stepped mirror arrangement 12.

The arrangement of the invention can also be ideally matched to any retroreflection problem which occurs in which an elongate retroreflector is required.

In the following figures the same reference numerals are used to designate the same parts as in the preceding figures.

As seen in FIGS. 3 and 4 the cylindrical lens arrangement consists of a cylindrical lens 16 and a light conducting rod 14' provided with a round cross-section, with the stepped mirror arrangement 12 of the invention being located on the side surface of the light conducting rod remote from the cylindrical lens 16, and with the stepped mirror arrangement being curved differently from the curvature of the light conducting rod 14', so that the central axis M of the stepped mirror arrangement 12 lies on the principle plane H of the cylindrical lens arrangement 11 formed by the light conducting rod 14' and the cylindrical lens 16. Furthermore, the central axis M again lies on the optical plane 19, while the focal line f of the cylindrical lens arrangement 11 is located in the vicinity of the stepped mirror arrangement 12. The retroreflecting characteristics in the two perpendicular planes of FIGS. 3 and 4 are again illustrated by beam parts which have been drawn in by way of example.

As seen in FIGS. 5 and 6 the cylindrical lens arrangement 11 comprises a rod-like glass body 20 essentially in the form of a cylindrical lens. The focal line f in this embodiment likewise lies in the stepped mirror arrangement 12 formed at the right cylindrical curved rear wall, with the mean axis of curvature M of the stepped mirror arrangement again being arranged on the principle plane H of the cylindrical lens arrangement 11. In this manner light beams entering in the plane of FIG. 5 are reflected back on themselves or parallel to themselves. In the plane of FIG. 6 the retroreflection however takes place, as in the previously described embodiments, at the individual mirrors of the stepped mirror arrangement 12.

I claim:

1. An elongate retroreflector comprising:
   a cylindrical lens arrangement having a lens axis, a focal line, and an optical axis;
   the cylindrical lens arrangement including a cylindrical light conducting rod and a first lens element physically separate from the light conducting rod; and
   the light conducting rod comprising a second lens element and a cylindrical stepped mirror arrangement having a mirror axis parallel to the lens axis, the stepped mirror arrangement including a plurality of grooved mirror surfaces, the focal line being arranged on the stepped mirror arrangement.

2. The retroreflector of claim 1 wherein the grooved mirror surfaces are arranged at 90° to one another.

3. The retroreflector of claim 1 wherein the mirror axis lies on the optical axis of the cylindrical lens arrangement.

4. The retroreflector of claim 1 wherein the stepped mirror arrangement extends symmetrically to the optical axis of the cylindrical lens arrangement.

5. The retroreflector of claim 10 wherein the cylindrical light conducting rod is a circular cylindrical rod in which the grooved mirror surfaces are formed in the rod at a mirror portion of the circumferential surface of the rod, the balance of the circumferential surface of the rod having a circular cylindrical shape with a constant first radius.

6. The retroreflector of claim 5 wherein the cylindrical stepped mirror arrangement has a circular cross-sectional contour having a second radius, the second radius being greater than the first radius.

7. An elongate retroreflector comprising:
   an elongate lens element;
   an elongate cylindrical light conducting rod positioned parallel to and spaced apart from the elongate lens element, the rod having a circumferential surface made up of first and second portions, the first portion having a circular cylindrical shape and being positioned between the elongate lens element and the second portion, the lens element and the light conducting rod constituting a cylindrical lens arrangement having a lens axis and a focal line;
   a cylindrical stepped mirror arrangement formed at the second portion, the stepped mirror arrangement including a plurality of coaxial grooved mirror surfaces, the stepped mirror arrangement having a mirror axis and a circular radius of curvature greater than the radius of curvature of the first portion;
   the lens axis and the mirror axis being parallel, the focal line being arranged on the stepped mirror arrangement; and
   the lens arrangement including an optical axis, the mirror axis passing through the optical axis.

8. The retroreflector of claim 7 wherein the stepped mirror arrangement is coextensive with the second portion.

* * * * *